United States Patent [19]

Kress et al.

[11] 4,279,550

[45] Jul. 21, 1981

[54] DEEP HOLE BORING TOOL WITH REPLACEABLE BLADE

[75] Inventors: Dieter Kress, Aalen; Friedrich Häberle, Lauchheim, both of Fed. Rep. of Germany

[73] Assignee: MAPAL Fabrik für Präzisionswerkzeuge Dr. Kress KG, Aalen, Fed. Rep. of Germany

[21] Appl. No.: 649,904

[22] Filed: Jan. 16, 1976

[30] Foreign Application Priority Data

Jan. 21, 1975 [DE] Fed. Rep. of Germany ....... 2502183

[51] Int. Cl.³ .................. B23B 41/02; B23B 51/06
[52] U.S. Cl. ........................ 408/59; 408/57; 408/153; 408/179; 408/197
[58] Field of Search ............ 408/59, 713, 185, 189, 408/197, 153, 56, 57, 60, 705

[56] References Cited

U.S. PATENT DOCUMENTS

| 1,304,981 | 5/1919 | Hoagland | 408/57 |
| 3,049,033 | 8/1962 | Benjamin et al. | 408/59 |
| 3,125,799 | 3/1964 | Bennett | 408/713 X |
| 3,286,557 | 11/1966 | Rietzler et al. | 408/179 |
| 3,333,489 | 8/1967 | Mossberg | 408/60 |
| 3,376,763 | 4/1968 | Welles | 408/59 |
| 3,422,706 | 1/1969 | Lunsford | 408/59 |
| 3,490,315 | 1/1970 | Melchiorre | 408/153 |
| 3,555,937 | 1/1971 | Nicodemas | 408/59 |
| 3,656,859 | 4/1972 | Rietzler et al. | 408/179 |
| 3,834,829 | 9/1974 | Munro | 408/179 |

*Primary Examiner*—William R. Briggs

[57] ABSTRACT

The cutting head of a boring tool has a cylindrically arcuate face about the axis of rotation and a radially and axially open groove for release of cooling fluid and chip removal. A single cutting plate is releasably recessed in one wall of the groove and a clamping jaw in the other wall in abutting engagement with the blade whose edge has a primary cutting portion axially projecting from an end portion of the cutting head and a secondary cutting portion radially projecting from the arcuate carrier face.

6 Claims, 4 Drawing Figures

U.S. Patent          Jul. 21, 1981          4,279,550
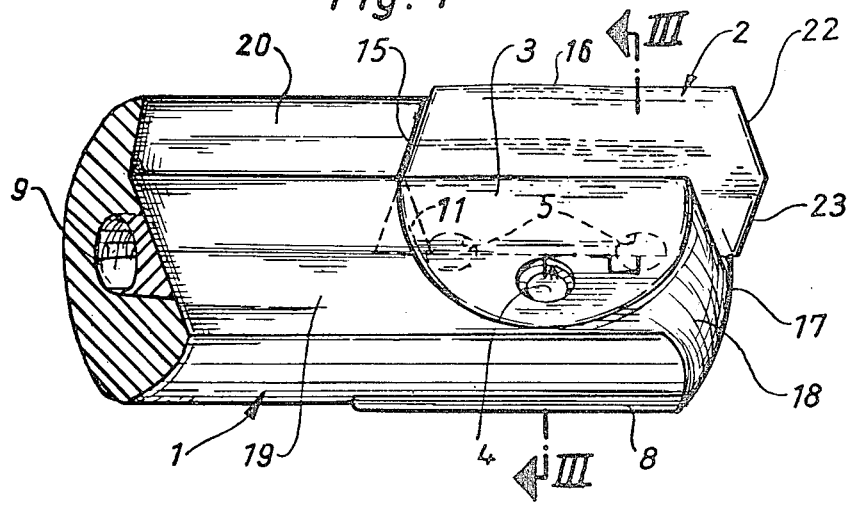
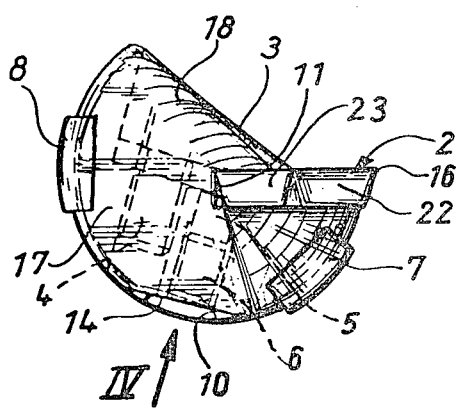 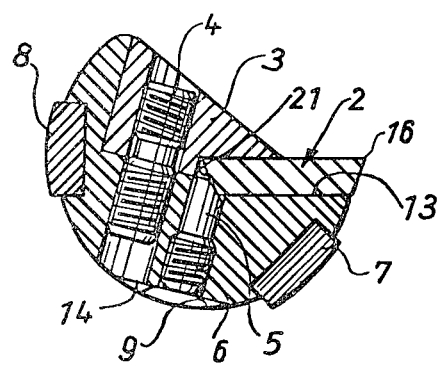
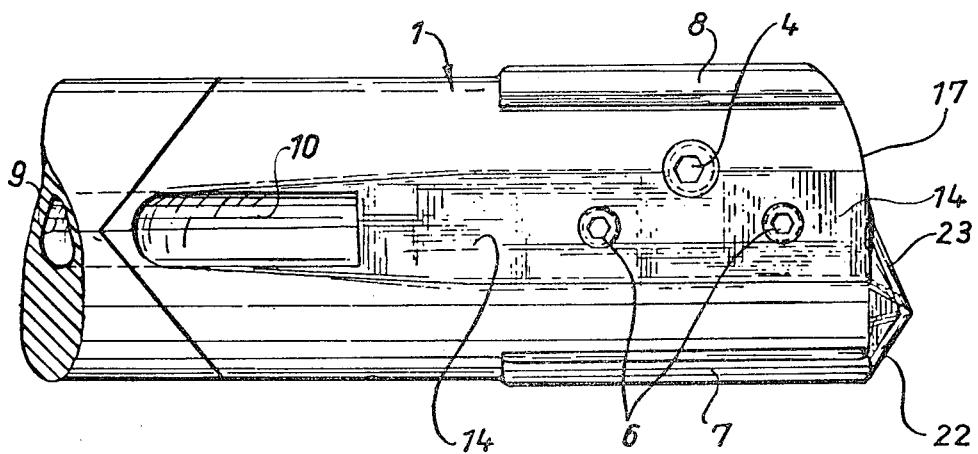

DEEP HOLE BORING TOOL WITH REPLACEABLE BLADE

This invention relates to machine tools, and particularly to a deep-hole boring tool of the type having a single cutting blade supplied with cooling fluid through a bore in the cutter shaft and an axial groove in its circumference for release of the cooling fluid and removal of chips.

Conventional deep-hole boring tools have either a unitary cutting head of carbide material ground to provide the single cutting edge and two guide faces, or a cutting head of steel in which a carbide blade and carbide guide ribs are fixedly fastened as by soldering.

The primary cutting edge of the blade is radially elongated and faces axially forward, and a secondary cutting edge is axially elongated. Wear of the blade is concentrated in the radially outermost portion of the primary cutting edge and the adjacent part of the secondary cutting edge. To sharpen a worn tool of the known type, the tool must be ground down axially because the effective diameter of the tool must not be reduced. The grinding step removes portions of the blade, of the guide ribs and usually also of the carrier for the blade and ribs. The procedure is time-consuming and expensive, and the same conventional boring tool can be reground only a few times before it needs to be rebuilt completely or replaced. Tool wear accounts for a significant portion of the cost of conventional deep-hole boring.

It is the primary object of this invention to provide a boring tool which permits a reduction in the cost of deep-hole boring.

With this object and others in view, the invention provides a tool whose elongated carrier is normally rotated about its longitudinal axis and has a convexly arcuate face about the axis. An axial bore in the carrier terminates in an orifice in one axial end portion of the carrier. The convex carrier face is formed with an axially and radially open groove bounded by first and second, axially extending surface portions of the carrier which are formed with respective recesses. A plate-shaped cutting blade is releasably received in the recess of the first surface portion and has two major surfaces separated by the thickness of the blade and connected by the edge of the blade. A primary cutting portion of the edge projects axially from the carrier end portion from which a secondary cutting portion of the blade edge projects radially. The blade is secured in the receiving recess by a clamping jaw received in the recess of the second surface portion and abuttingly engaging the blade.

Other features, additional objects, and many of the attendant advantages of this invention will readily be appreciated as the same becomes better understood by reference to the following detailed description of a preferred embodiment when considered with reference to the appended drawing in which:

FIG. 1 shows the cutting head portion of a boring bar in a perspective view;

FIG. 2 is an end view of the head portion;

FIG. 3 shows the device of FIG. 1 in section on the line III—III; and

FIG. 4 is a side-elevational view of the head portion taken in the direction of the arrow IV in FIG. 2.

Referring now to the drawing in detail, and initially to FIG. 1, there is shown the free end or cutting head portion of a boring bar 1 machined from cylindrical steel stock. A radially and axially open groove in the cylindrically arcuate circumference of the bar 1 is bounded by flat, elongated, angularly offset surface portions 19, 20 of the bar which serves as a carrier for a single, carbide, cutting blade 2 and two axially elongated carbide guide ribs of which only one rib 8 is seen in FIG. 1.

The blade 2 has the shape of a hexagonal, elongated plate whose two major surfaces are parallel and connected by the six, straight parts of the narrow blade edge. The blade is symmetrical relative to its longitudinal and transverse, median planes which intersect the blade 2 in the direction of its thickness at right angles to the major blade surfaces. The blade 2 is recessed in the surface portion 20 of the bar 1 in such a manner that one of its major surfaces is practically flush with the surface portion 20.

The edge of the blade 2 has two parts 22, 23 which project axially beyond the frontal end face 17 of the bar 1. They are radially elongated, obliquely inclined relative to the tool axis, and converge at an obtuse angle in a corner of the blade to constitute the primary cutting edge portion of the blade. The recess 11 in the surface portion 20 is rearwardly bounded by a narrow, planar wall 15 of the bar 1 which is parallel to the radially inner part 23 of the primary cutting edge portion.

The secondary cutting edge portion 16 of the blade 2 is parallel to the tool axis and longitudinal of the blade 2. It radially projects beyond the circumferential face of the bar 1. The other longitudinal edge portion is obscured in FIG. 1 and cooperates with two adjusting elements 5, as will presently be described. The blade 2 is releasably secured in the bar 1 by a clamping jaw 3 recessed in the surface portion 19 of the bar 1 in such a manner that its exposed major surface is practically flush with the surface portion 19. The jaw 3 is held in abutting engagement with the blade 2 by a clamping screw 4.

During operation of the illustrated tool, cooling fluid is fed to the cutting area through a central, axial bore 9 of the bar 1 and flushes chips from the cutting area along the frontal end face 17 which spirals gently in an axial direction from the major surface of the blade 2 obscured in FIG. 1 to the open axial end of the groove bounded by the surface portions 19, 20, and rearwardly out through the groove. Smooth flow of chips suspended in the cooling fluid without agglomeration is ensured by a three-dimensionally convex face portion 18 of the bar 1 which merges arcuately and smoothly with the frontal end face 17 and the surface portion 19. The recessed blade 2 and jaw 3 do not interfere with chip removal.

As is better seen in FIG. 2, the blade 2 is trapezoidal in cross section. If its cutting edge portions 16, 22, 23 are worn dull, the blade may be turned over to present to a workpiece the edge portions partially obscured in FIG. 1. The guide rib 8 is diametrically opposite to the edge portion 16, and the other guide rib 7 is much nearer the blade 2 than the rib 8, as is conventional in itself. A flat 14 is ground between the ribs 7, 8 in the cylindrically arcuate circumference of the illustrated end portion of the bar 1, and the orifice 10 of the bore 9 is located in the flat 14, as is still better seen in FIG. 4. The flat 14 and the inner wall of the workpiece thus bound a channel for flow of the cooling fluid toward the cutting area.

The precise diameter of the bore produced in a workpiece may be set by radially shifting the blade 2 in the recess 11. As is shown in FIG. 3, the adjustment elements 5 are cylinders having oblique contact faces which engage the obscured longitudinal edge portion 21 of the blade 2 in area contact. The elements 5 are movably received in bores of the bar 1 which communicate with the recess 11 and the channel partly defined by the flat 14, and are partly threaded for engagement by set screws 6 adjustably backing the elements 5. The blade 2 may thus be shifted radially outward along the bottom 13 of the recess 11 by turning the screws 6. The blade is held engaged with the adjusting elements 5 by the pressure of the work.

The clamping screw 4 has a left-handed and a right-handed thread which engage respective mating threads in a bore of the bar 1 and in the jaw 3 which is open toward the flat 14. A dull blade 2 is readily released by the screw 4 from the bar 1 to be turned over or to be replaced by a fresh blade without disconnecting the bar 1 from its associated drive, not shown.

The adjusting elements 5 and their backing screws 6 permit a precise setting of the edge 16 to a radius identical with the effective radius of the guide ribs 7, 8, an essential condition for proper tool operation at the high cutting speeds customary in deep-hole boring.

It should be understood, of course, that the foregoing disclosure relates only to a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:

1. A boring tool comprising:
   (a) an elongated carrier having a longitudinal axis,
      (1) an axial end portion of said carrier having a convexly arcuate face about said axis,
      (2) said carrier being formed with an axial bore terminating in an orifice in said face,
      (3) said end portion having first and second axially extending surface portions bounding a groove in said face, said groove being open in a radially outward direction and in both axial directions,
      (4) said surface portions being formed with respective recesses;
   (b) a plate shaped cutting blade releasably received in the recess of said first surface portion and having two major surfaces separated by the thickness of said blade and connected by the edge of said blade,
      (1) a primary cutting portion of said edge axially projecting from said end portion,
      (2) a secondary cutting portion of said edge radially projecting from said end portion, and
      (3) one of said major surfaces being exposed in said groove and substantially flush with said first surface portion;
   (c) clamping means for securing said blade in the receiving recess,
      (1) said clamping means including a clamping jaw received in said recess of said second surface portion and abuttingly engaging said blade,
      (2) said clamping jaw having a major exposed surface substantially flush with said second surface portion.

2. A tool as set forth in claim 1, wherein said blade is axially elongated and substantially symmetrical relative to a longitudinal plane intersecting said blade in the direction of said thickness, said edge having six angularly offset, straight parts, two of said parts being symmetrical relative to said plane and constituting said primary cutting portion, a third part being parallel to said plane and constituting said secondary cutting portion.

3. A tool as set forth in claim 2, wherein said blade is substantially symmetrical relative to a plane transverse to said longitudinal plane and intersecting said blade in the direction of said thickness, a fourth part of said edge being parallel to one of said two parts, said carrier having a wall in said recess of said first surface portion conformingly engaging said fourth part.

4. A tool as set forth in claim 1, further comprising two axially elongated guide ribs angularly spaced from each other and from said blade and radially projecting from said face, said face being formed with an axially elongated radially open channel circumferentially interposed between said ribs and communicating with said orifice.

5. A tool as set forth in claim 4, further comprising two adjusting elements movable in respective bores of said carrier communicating with said recess in said first surface portion and with said channel, said edge having an axially elongated portion abuttingly engaged by said adjusting elements.

6. A tool as set forth in claim 1, wherein said end portion of said carrier has a transverse end face circumferentially spiraling from said blade and arcuately merging with said second surface portion.

* * * * *